(12) United States Patent
Petersen et al.

(10) Patent No.: US 10,091,217 B2
(45) Date of Patent: Oct. 2, 2018

(54) RISK BASED PRIORITY PROCESSING OF DATA

(71) Applicant: LogRhythm Inc., Boulder, CO (US)

(72) Inventors: Christopher L. Petersen, Boulder, CO (US); Mark Vankempen, Boulder, CO (US)

(73) Assignee: LogRhythm, Inc., Boulder, CO (US)

(*) Notice: Subject to any disclaimer, the term of this patent is extended or adjusted under 35 U.S.C. 154(b) by 227 days.

(21) Appl. No.: 15/187,947

(22) Filed: Jun. 21, 2016

(65) Prior Publication Data
US 2017/0366561 A1 Dec. 21, 2017

(51) Int. Cl.
*G06F 21/55* (2013.01)
*H04L 29/06* (2006.01)

(52) U.S. Cl.
CPC ...... *H04L 63/1408* (2013.01); *H04L 63/1416* (2013.01); *H04L 63/1425* (2013.01); *H04L 63/1433* (2013.01); *G06F 21/552* (2013.01); *G06F 21/554* (2013.01)

(58) Field of Classification Search
CPC .................................. H04L 63/1408–63/1433
See application file for complete search history.

(56) References Cited

U.S. PATENT DOCUMENTS

| | | | | |
|---|---|---|---|---|
| 9,787,709 | B2* | 10/2017 | Doubleday | H04L 63/1433 |
| 2002/0024946 | A1* | 2/2002 | Jeong | H04L 29/12009 |
| | | | | 370/352 |
| 2006/0265746 | A1* | 11/2006 | Farley | G06F 21/577 |
| | | | | 726/22 |
| 2007/0169194 | A1* | 7/2007 | Church | G06F 21/552 |
| | | | | 726/23 |
| 2008/0172347 | A1* | 7/2008 | Bernoth | H04L 63/0263 |
| | | | | 706/12 |
| 2013/0166667 | A1* | 6/2013 | Carr | H04L 51/12 |
| | | | | 709/206 |
| 2014/0325670 | A1* | 10/2014 | Singh | G06F 21/60 |
| | | | | 726/26 |
| 2015/0163242 | A1* | 6/2015 | Laidlaw | G06F 21/552 |
| | | | | 726/22 |
| 2015/0350174 | A1* | 12/2015 | Reno | H04L 63/1433 |
| | | | | 726/3 |
| 2015/0370723 | A1* | 12/2015 | Nambiar | G06F 12/121 |
| | | | | 711/159 |
| 2016/0028759 | A1* | 1/2016 | Visbal | H04L 63/1441 |
| | | | | 726/22 |
| 2016/0037367 | A1* | 2/2016 | Li | H04W 12/02 |
| | | | | 370/312 |
| 2016/0226905 | A1 | 8/2016 | Baikalov et al. | |
| 2016/0330228 | A1* | 11/2016 | Knapp | H04L 63/1433 |

(Continued)

*Primary Examiner* — Lisa C Lewis
*Assistant Examiner* — Zhimei Zhu
(74) *Attorney, Agent, or Firm* — Marsh Fischmann & Breyfogle LLP; Jonathon A. Szumny

(57) ABSTRACT

Utilities (e.g., methods, systems, apparatuses, etc.) for use in generating and making use of priority scores for data generated by one or more data systems that more accurately prioritize those events and other pieces of data to be addressed by analysts and troubleshooters before others (e.g., collectively taking into account threats posed by origin host components and risks to impacted host components) to work the highest risk events and alarms first and to effectively and efficiently spend their alarm monitoring time.

8 Claims, 10 Drawing Sheets

(56) References Cited

U.S. PATENT DOCUMENTS

| | | | |
|---|---|---|---|
| 2017/0230402 A1* | 8/2017 | Greenspan | H04L 63/1433 |
| 2017/0263092 A1* | 9/2017 | Rankin | G08B 13/22 |
| 2017/0272457 A1* | 9/2017 | Ikeda | H04L 63/1425 |

* cited by examiner

| FIELD | OPTIONAL | DESCRIPTION | LOG MANAGER | EVENT MANAGER |
|---|---|---|---|---|
| SIP (INTEGER) | YES | SOURCE IP ADDRESS REPRESENTED AS AN 8 BYTE INTEGER. | YES | YES |
| DIP (INTEGER) | YES | DESTINATION IP ADDRESS REPRESENTED AS AN 8 BYTE INTEGER. | YES | YES |
| SPort (INTEGER) | YES | SOURCE TCP/UDP PORT NUMBER. | YES | YES |
| DPort (INTEGER) | YES | DESTINATION TCP/UDP PORT NUMBER. | YES | YES |
| ProtocolID (INTEGER) | YES | THE PROTOCOL ASSOCIATED WITH THE LOG AS DETERMINED BY PARSING EITHER THE PROTOCOL NAME OR IANA NUMBER. | YES | YES |
| LOGIN (CHAR 50) | YES | THE VALUE PARSED FOR LOGIN. | YES | YES |
| SName (CHAR 100) | YES | VALUE PARSED FOR SOURCE HOST NAME. | YES | YES |
| DName (CHAR 100) | YES | VALUE PARSED FOR DESTINATION HOST NAME. | YES | YES |
| PERSON (CHAR 50) | YES | VALUE PARSED PERSON FIELD (E.G., JOE BLOW, JANE DOE). | NO | YES |
| ACTION (CHAR 50) | YES | VALUE PARSED FOR ACTION (E.G., LOGIN, LOGOUT, REBOOT) | NO | YES |
| RESULT (CHAR 50) | YES | VALUE PARSED FOR RESULT (E.G., SUCCESS, FAILURE, ERROR) | NO | YES |
| PROGRAM (CHAR 50) | YES | VALUE PARSED FOR PROGRAM (E.G., PROGRAM NAME, PID) | NO | YES |
| OBJECT (CHAR 255) | YES | VALUE PARSED FOR OBJECT (E.G., C:\WINNT\CMD.EXE) | NO | YES |
| UserField1 (CHAR 50) | YES | VALUE PARSED FOR STORAGE IN USER FIELD 1 | NO | YES |
| UserField2 (CHAR 50) | YES | VALUE PARSED FOR STORAGE IN USER FIELD 2 | NO | YES |
| UserField3 (CHAR 50) | YES | VALUE PARSED FOR STORAGE IN USER FIELD 3 | NO | YES |

FIG. 2

| FIELD | OPTIONAL | DESCRIPTION | LOG MANAGER | EVENT MANAGER |
|---|---|---|---|---|
| UserField4 (CHAR 255) | YES | VALUE PARSED FOR STORAGE IN USER FIELD 4 | NO | YES |
| UserField5 (CHAR 255) | YES | VALUE PARSED FOR STORAGE IN USER FIELD 5 | NO | YES |

FIG. 2
(CONTINUED)

| FIELD | OPTIONAL | DESCRIPTION | LOG MANAGER | EVENT MANAGER |
|---|---|---|---|---|
| MsgClassID (INTEGER) | | A FOREIGN KEY REFERENCE TO THE LOG'S CLASSIFICATION. | YES | YES |
| CommonEventID (INTEGER) | | A FOREIGN KEY REFERENCE TO THE LOG'S COMMON EVENT RECORD. | YES | YES |
| MPERuleID (INTEGER) | | A FOREIGN KEY REFERENCE TO THE MPE RULE THAT MATCHED THE LOG MESSAGE. | YES | YES |
| PRIORITY (INTEGER) | | THE RISK-BASED PRIORITY CALCULATED FOR THE LOG/EVENT. | YES | YES |
| DIRECTION (INTEGER) | | THE DIRECTION OF THE LOG/EVENT. | YES | YES |
| SHostID (INTEGER) | | A FOREIGN KEY REFERENCE TO THE LOG/EVENT SOURCE HOST RECORD (IF DETERMINED). | YES | YES |
| DHostID (INTEGER) | | A FOREIGN KEY REFERENCE TO THE LOG/EVENT SOURCE HOST RECORD (IF DETERMINED). | YES | YES |
| ServiceID (INTEGER) | | A FOREIGN KEY REFERENCE TO THE LOG APPLICABLE SERVICE/PROGRAM (IF DETERMINED). | YES | YES |

KNOWN HOST RECORDS

| IPv4 Address | IPv6 Address | MAC Address | Hostname | Type | Risk/Threat Level |
|---|---|---|---|---|---|
| 173.8.226.34 | fe80::200:f8ff:fe21:67cf | 00:0a:95:9d:68:16 | PMV2244PM | External | 5 |
| 224.56.5.2 | 2001:0:3238:DFE1:63::FEFB | 00-14-22-01-23-45 | LR-1122RK-MRA | | 5 |
| 172.18.3.255 | ABC:567::8888:9999:1111:0 | 00:A0:C9:14:C8:29 | www.example.com | | 0 |
| 15.25.25.36 | 2001:DB8:4D1C:221A::/64 | 00:25:96:12:34:56 | LR-0980EM-MRA | Internal | 1 |
| 15.25.25.211 | 2002:4559:1FE2::4559:1FE2 | | odlinux.distilled.com | | |
| 15.25.144.38 | | | | | 6 |

FIG. 8a

KNOWN IDENTIFIER RANGE RECORDS

| IPv4 Address Range | IPv6 Address Range | Type | Risk/Threat Level |
|---|---|---|---|
| 173.8.226.34-174.21.25.244 | ASX:200::f22:dd21:4-0030::200:cc3f:fe21:67cf | External | 3 |
| | 2001:0:3238:DFE1:63::FEFB- | | |
| 224.0.0.1-224.44.123.1 | 2002:0::21:DFE1:63::FEFB | | 5 |
| | | | |

FIG 8b

KNOWN IDENTIFIER LIST RECORDS

| List # | Identifiers | Risk/Threat Level |
|---|---|---|
| 1 | 25.28.111.244 | 3 |
| | 36.255.23.111 | |
| | 55.55.12.147 | |
| 2 | 55.55.12.147 | 8 |
| | 36.52.126.24 | |
| | 233.32.21.1 | |
| | | |

FIG. 8c

RISK BASED PRIORITY PROCESSING OF DATA

BACKGROUND

1. Field of the Invention

The present invention relates in general to network monitoring and information management for identifying threats and other types of events of interest and, more particularly, to assessing and assigning risk levels to identified threats and events to allow personnel to more efficiently address such threats and events.

2. Relevant Background

Modern organizational infrastructures (e.g., made up of routers, switches, file servers, and the like) are constantly generating voluminous levels of data (e.g., log messages, machine-readable data, etc.) that is typically analyzed by various types of security and event management products that are configured to intelligently process the data to identify various events of interest. For instance, many such products include a user interface in the form of a dashboard that allows troubleshooters and other entity personnel to view a display (e.g., list, map, etc.) of such identified events and take remedial action if necessary. Each graphically displayed event may include or allow the personnel to view various types of information including but not limited to a classification of the event (e.g., "compromise," "denial of service," etc.), normalized time stamps corresponding to when the event was first detected, a source of the data, etc. Personnel may also be able to drill down into the event on the dashboard to obtain more detailed information such as the original (e.g., pre-processed or raw) data, metadata about the same, and/or the like.

SUMMARY

Existing products are sometimes able to determine and assign a "risk based priority" (RBP) score or value to data such as raw logs, events or threats identified therefrom, other machine-readable data, and/or the like and display the same along with the data on the dashboard or other user interface to allow personnel to address certain data before other data (and to thus more efficiently process and handle the same). Each RBP score may be a value that generally collectively takes into account threats posed by some components and risks to other components. For instance, events may be assigned an RBP score from 1-100, where an increasing RBP score may indicate an increasing need to address the event by troubleshooters and the like. In some situations, personnel may be able to set a minimum threshold RBP score for detected events, where only those events having an RBP score above the threshold may be flagged or forwarded as an "alarm" to be addressed by personnel.

Even though RBP scores and the like allow troubleshooters and personnel to better prioritize and handle identified events and the like, existing products and solutions for doing so are inefficient and inaccurate in a number of regards. As an example, some existing products tend to err on the side of caution and assign higher RBP scores to events than may otherwise be warranted to reduce the likelihood that an important event is not addressed and that, for instance, an organization's network is not infiltrated by malware and sensitive data compromised. However, this situation often results in "alarm fatigue" whereby many more events and alarms are received than can possibly be adequately addressed by personnel and where such events and alarms are inaccurately prioritized.

As another example, many existing products may assign risk or threat levels to specific identifiers such as host names, Internet Protocol (IP) addresses, and the like. Upon receipt of data generated by one or more data systems, for instance, existing products may parse such identifiers from the data (e.g., IP addresses of origin and impacted hosts), access a database to obtain risk or threat levels assigned to the parsed identifiers, and then incorporate the obtained risk or threat levels into any appropriate algorithm to generate an RBP score for the data. In the case where a risk or threat level is not assigned to a particular parsed identifier, however, a value of zero is often incorporated into the algorithm for the particular parsed identifier to indicate that the risk or threat level for the parsed identifier is unknown or not yet set resulting in the risk or threat level for the parsed identifier being artificially lower than it otherwise should be. As a result, generated RBP scores for the data or events associated therewith may also be lower than they otherwise should and potentially dangerous threats may go unnoticed or unaddressed.

In this regard, disclosed herein are various utilities (e.g., methods, systems, etc.) for use in generating and making use of RBP scores for data from one or more data systems that more accurately represent and prioritize the level of risk presented by the data and that thus allow analysts and troubleshooters to more effectively and efficiently spend their alarm monitoring time by working the highest risk data first.

One utility disclosed herein is configured to monitor data generated by one or more data systems by way of receiving data generated by one or more data systems at a processing platform over at least one communications network (e.g., where the data may be one or more logs or log messages, events designated from the logs or log messages, structured data that has been enriched or appended with metadata, other machine-readable data, etc.), operating the processing platform to parse from the data at least one of an origin host identifier (e.g., host name, IP address, MAC address, etc.) associated with an origin host component responsible for initiating an occurrence on the one or more data systems and an impacted host identifier (e.g., host name, IP address, MAC address, etc.) associated with an impacted host component that is affected by an occurrence on the one or more data systems, ascertaining whether any previously-configured relative threat or risk levels specific to the parsed identifiers can be obtained (e.g., where each relative threat level is a value or level that represents a relative threat that an origin or a source component may pose to the organization while each relative risk level is a value or level that represents a relative risk that a destination or an impacted component may be targeted or affected by occurrences on the data systems or vulnerability to being targeted by such occurrences), and using the processing platform to generate an RBP score for the data based on a result of the ascertaining.

For instance, organizations may maintain or at least have access to one or more data structures or lists of "known" hosts, where each known host record may include various identifying information for a specific host component such as IP address, host name, MAC address, relative risk or threat level(s), type (e.g., internal/private or external/public), and/or the like. The known host records may be accessed by the processing platform after the processing platform has parsed or obtained one or more identifiers from the data. As one example, organizational personnel may be able to manually set or otherwise configure (e.g., through any appropriate user interface) relative risk or threat levels for each of a plurality of different known host records. Additionally or alternatively, organizations may be able to access relative risk or threat levels for each of a plurality of identifiers from one or more third-party data structures or lists and store the same in the known host records for access by the processing platform.

In the event the processing platform ascertains that relative risk or threat levels for all identifiers parsed from the data can be obtained (e.g., from the list/data structure of known host records), the processing platform may use the obtained relative risk or threat levels to generate an RBP score for the data in any appropriate manner (e.g., according to any appropriate algorithm). As one simplistic example, the processing platform may be configured to combine (e.g., add) the various relative risk or threat levels in any appropriate manner to provide an indication of the RBP score for the data.

Additional types of relative risk or threat levels may be appropriately combined with those of the parsed identifiers to determine the RBP score for the data. As an example, in the case where the data has already been initially processed by one or more processing rules (e.g., including any appropriate expressions or syntax that match one or more portions of the structured data) to generate an event or other structured data, relative risk or threat levels that have previously been assigned to the particular one or more processing rules may be incorporated into the determination of the RBP score by the processing engine. For instance, particular processing rules that are configured to identify data that is indicative of successful exploit of a web server may be assigned higher relative risk or threat levels than are other processing rules that are configured to identify data that is indicative of an attack that failed to bypass the organization's firewall. In the case where the one or more processing rules or the like assign one or more classifications to the data (e.g., "compromise," "denial of service," etc., such as by writing such classifications to one or more data fields of the data), relative risk or threat levels previously assigned to each of such classifications may be obtained by the processing platform and incorporated into the determination of the RBP score. For instance, relative risk or threat levels for various particular processing rules, data classifications, and the like may be maintained in one or more data structures that are accessible by the processing platform for use in determination of the RBP score.

In some embodiments, one or more of the relative risk or threat levels may be weighted in any appropriate manner before or as part of determination of the RBP score for the data to provide personnel with more fine grained control over how RBP scores are determined. As just one example, a particular classification being assigned to data may be highly indicative that an event has occurred that is of low interest to organizational personnel and thus may be assigned a high relative risk level of 80 on a scale of 1-100 by personnel but a low weighting level of 20 on a scale of 1-100. On the other hand, another particular classification being assigned to data may not be very indicative that a highly interesting event has occurred and thus may be assigned a low relative risk level of 15 on a scale of 1-100 by personnel but a high weighting level of 85 on a scale of 1-100.

In one arrangement, the processing platform may process the data against one or more processing rules that are configured to identify data (e.g., events) having RBP scores higher than a particular threshold and forward the same to a platform/event manager or the like for further processing or consideration. For instance, personnel may be able to set the threshold on any appropriate user interface in communication with the processing platform.

In some situations, the processing platform may determine that at least one of the origin host identifier or impacted host identifier cannot be used to obtain a previously-configured relative risk or threat level from the data structure of known hosts (e.g., from the known host records). For instance, there might be no known host record that includes the parsed identifier. Alternatively, there might be a known host record including the parsed identifier but personnel has not yet specifically set or configured the relative risk or threat level for the host. Still further, there might be a known host record including the parsed identifier but personnel has intentionally entered a zero/null/unknown entry for the relative risk or threat level field for the known host record.

In any case, some existing products treat such identifiers as if they have no or zero risk or threat level which can skew RBP scores to be lower than they otherwise should. In this regard, the disclosed utility may include obtaining, by the processing platform, a substitute relative risk or threat level for the origin host component or impacted host component using the at least one of the origin host identifier and impacted host identifier and then proceeding to generate a RBP score for the data with the substitute relative risk or threat level.

In one arrangement, the substitute relative risk or threat level may be a relative risk or threat level assigned to a network within which the identifier is contained. For instance, organizational personnel may assign relative risk or threat levels to specific IP address ranges and store the same in the above-discussed database. In the case where a parsed origin or impacted host identifier being an IP address for which a known host relative risk or threat level is zero or unknown and that is resident within such an IP address range, the parsed origin or impacted host identifier may be assigned the relative risk or threat level of the IP address range (e.g., as a "substitute" relative risk or threat level).

In another arrangement, the substitute relative risk or threat level may be a relative risk or threat level assigned to a list of identifiers within which the parsed identifier is contained. As just one example, an organization may maintain a plurality of different lists of host names, where each list is assigned a single particular relative risk or threat level. Upon determination that a particular parsed identifier has not been specifically assigned a relative risk or threat level (e.g., the parsed identifier is not present in a specific known host record in the database), the processing platform may access the lists of identifiers to determine whether the parsed identifier is resident within any of the lists and assign the parsed identifier the relative risk or threat level of the list within which the parsed identifier is residence (e.g., as a "substitute" relative risk or threat level).

In the case where the parsed identifier is resident within two or more networks or two or more lists, the parsed identifier may be assigned the highest relative risk or threat level of the two or more lists networks or lists. Alternatively, the relative risk or threat levels of the two or more networks or lists may be combined in any appropriate manner (e.g., averaged) or according to any appropriate algorithm to determine the substitute relative risk or threat level for the parsed identifier.

In a further arrangement, the substitute relative risk or threat level may be a default relative risk or threat level that may be assigned to all identifiers not resident in a known host record, a known network range, or a known list of identifiers. More specifically, analysts may be able to set or configure various different default relative risk or threat levels that may be accessed by the processing platform and assigned to such identifiers (for use in generation of an RBP score for the data) based on one or more inquiries or determinations that may be made of the identifiers. As an example, one inquiry may be whether a particular identifier represents an "origin" host component or an "impacted" host component in the structured data.

For instance, as part of initial processing of data (e.g., raw log text) by the processing platform (or by another processing platform), various information (e.g., content) may be parsed or otherwise determined from the data and then populated into specific data fields that may be appended to the data to create structured data such as an event or the like. Among other data fields (e.g., classification, direction, log source, etc.), some of the data fields may be "IP Address (Origin)," "IP Address (Impacted)," "Hostname (Origin)," "Hostname (Impacted)," etc. In this regard, the processing platform may surmise or determine that a particular identifier identifies an origin host or an impacted host based on the particular data field from which the identifier was parsed. Users may be able to configure or set one or more first default relative risk or threat levels to be assigned to identifiers when the identifiers represent an origin host and one or more second default relative risk or threat levels to be assigned to identifiers when the identifiers represent an impacted host.

Another inquiry may be whether the identifier represents or can be inferred to represent an internal (e.g., private) host or an external (e.g., public) host. In one arrangement, analysts may choose to configure different default threat levels based on whether the identifier identifies an origin or impacted host and whether the host is known or inferred to be internal or external. For instance, the one or more first default relative risk or threat levels to be assigned to identifiers when the identifiers represent an origin host may include an external host default threat level for when the origin host component is inferred to be an external host and an internal host default threat level for when the origin host component is inferred to be an internal host. Also, the one or more second default relative risk or threat levels to be assigned to identifiers when the identifiers represent an impacted host may include an external host default threat level for when the impacted host component is inferred to be an external host and an internal host default threat level for when the impacted host component is inferred to be an internal host. For instance, analysts may choose to set the default risk levels for identifiers that represent or are inferred to represent impacted, internal host components higher than the default risk levels for identifiers that represent or are inferred to represent impacted, external host components. As another example, analysts may choose to set the default risk levels for identifiers that represent or are inferred to represent origin, external host components higher than the default risk levels for identifiers that represent or are inferred to represent origin, internal host components.

Various processes may be employed to infer whether a particular parsed identifier represents an internal host component or an external host component. As one example, the processing platform may, as part of accessing a known host record within which the parsed identifier is resident (e.g., but in which a relative risk or threat level is not present or otherwise unknown), determine that the known host record has been specifically configured as "internal" or "external" (e.g., by way of parsing the content of a "type" data field in the known host record). As another example, the processing platform may determine whether the parsed identifier is resident in a network that has been specifically configured as internal or external. For instance, personnel may maintain and the processing platform may have access to a database of known network records, where each known network record may include various identifying information for a specific network such as a range of IP addresses, network name, host names, MAC addresses, relative risk or threat level(s), type (e.g., internal/private or external/public), and/or the like. The processing platform may use the parsed identifier (e.g., and/or a network name parsed from the data) to identifier a known network record and obtain the network type (e.g., internal or external) therefrom. As a further example, the processing platform may determine that the host component is internal when the parsed identifier is an IP address that is resident with an internal/private network range (e.g., 10.0.0.0-10.255.255.255, 172.16.0.0-172.31.255.255, or 192.168.0.0-192.168.255.255) and determine that the host component is external when the parsed identifier is an IP address that is not resident with an internal/private network range.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 2 illustrates a table of data fields specifying content that may be parsed or obtained from data such as log messages and populated into corresponding data fields that may be appended to or otherwise associated with the data.

FIG. 3 illustrates another table of data fields specifying content that may be determined from data such as log messages and populated into corresponding data fields that may be appended to or otherwise associated with the data.

FIG. 5 illustrates another screenshot of a user interface that provides information regarding a particular piece of data that has been collected and processed according to the utilities disclosed herein.

FIGS. 8a-8c present various tables of data fields for use with the system of FIG. 6 and the method of FIG. 7.

DETAILED DESCRIPTION

The present invention relates in general to network monitoring and information management for identifying threats and other types of events of interest and, more particularly, to assessing and assigning risk levels to data such as identified threats and events to allow personnel to more efficiently address such threats and events. The utilities (e.g., systems, apparatuses, methods) disclosed herein are applicable to a broad variety of applications for virtually any type of system that generates data (e.g., computer servers, mainframes, network devices, security devices, access control devices, etc.). While much of the present discussion will be in relation to data in the form of log messages and other log-related data, it should be appreciated that the present utilities are applicable to numerous other types of data (e.g., forensic data, transactional data, activity data, other machine-readable data and/or the like).

Figure 1:
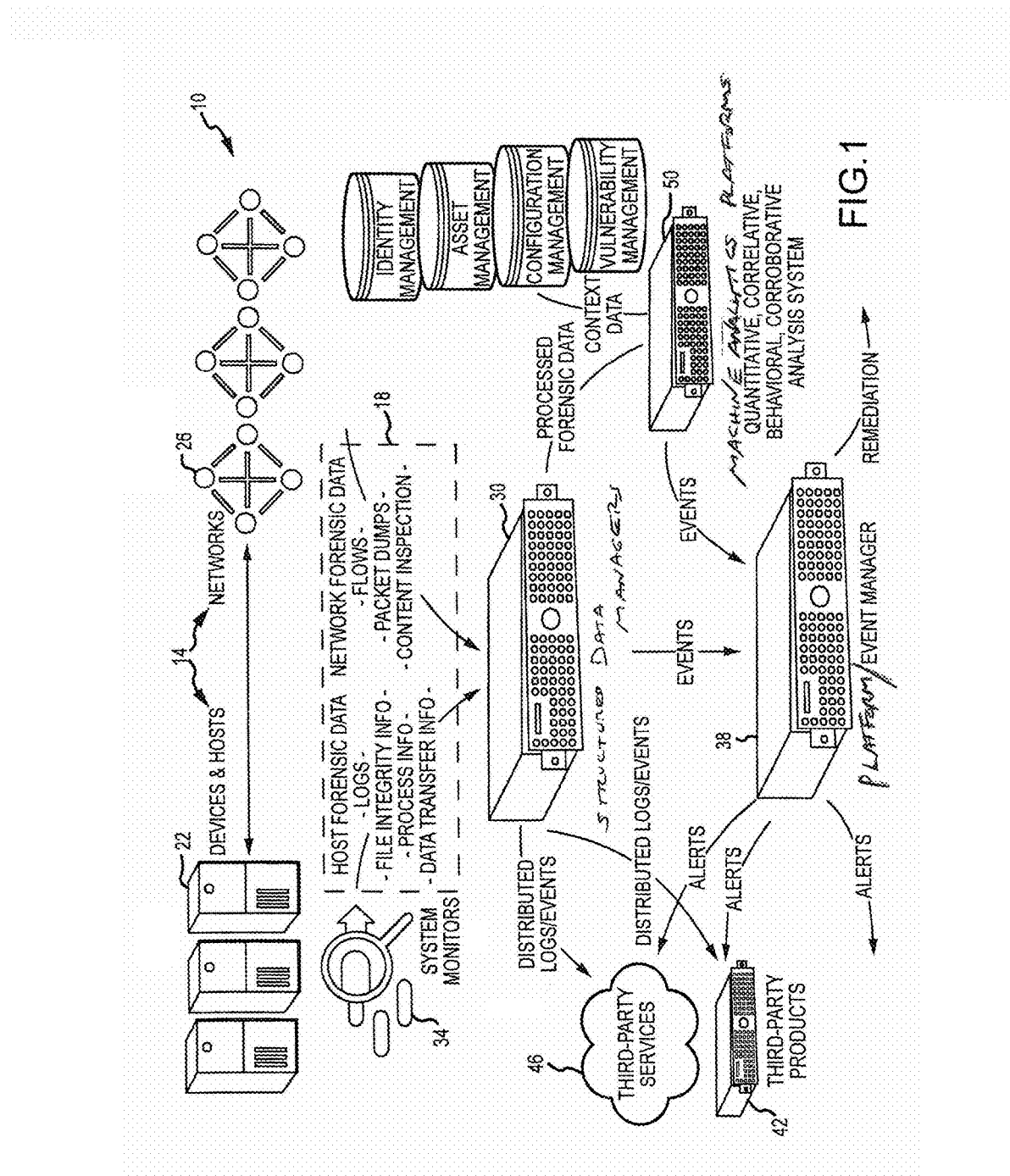
FIG. 1 is a block diagram of a system that provides for management of data generated by one or more data platforms and events associated therewith.

Before discussing the RBP processing utilities disclosed herein in more detail, reference will be initially made to FIG. 1 which illustrates one representative environment in which such utilities may be employed although it is to be understood that the disclosed utilities may be utilized in numerous other contexts as well. For instance, the system 10 of FIG. 1 may be that disclosed in U.S. Pat. No. 8,543,694 which is assigned to the assignee of the present application and which is incorporated herein by reference. The system 10 generally provides for the collection and processing, of various types of data generated by or gleaned from one or more devices, networks, processes, and the like, analysis thereof in numerous manners for detecting cyber threats and attacks, ensuring compliance with applicable reporting requirements, etc., taking remedial actions, and the like. As shown, the system 10 may include one or more root data sources 14 that generate one or more types of data 18 that may be analyzed in numerous manners to extract meaningful information therefrom. The root data sources 14 may be represented by hosts or devices 22 (e.g., computers, servers, routers, switches) and networks 26 (although numerous other forms of root data sources 14 are also envisioned), and may each generate a plurality of text files describing various occurrences or developments associated with the operations of the root data source 14. The generated text files may also be routinely updated by the root data sources 14 as various events transpire during the root data sources' 14 operations, a process that may be referred to as "logging." Additionally, while text files are often used for logging because of their readily manageable format, data such as log messages may come in other formats as well.

The root data sources 14 that generate the data 18 may come in a variety of configurations, with each being capable of generating a tremendous amount of data 18 such as log messages. For example, one of the devices 22 may be a computer (e.g., server, desktop, notebook, laptop, computer workstation, mainframe system) that is operable within a computer network configuration. In this regard, the computer may be responsible for delivering applications to other devices 22 or processes within the computer network, administering communications among computers within the computer network, controlling various features of the computer network, and the like. In the process of performing these functions, although partially dependent upon the number of computers within the network, the computer may generate thousands, millions, etc. of log entries per day. To illustrate, when a user incorrectly attempts to logon to a single computer on the computer network, the computer may generate a log entry noting a particular time (e.g., timestamp) that an improper procedure was performed. Other examples of occurrences or developments that may cause the generation of log messages include, inter alia, application launch failures, audit activity, attacks, operating system errors, and the like.

While the data 18 may be in the form of log messages or entries generated by or gleaned from root data sources 14, the data 18 may take numerous other forms as well. For instance, the data 18 generated by devices 22 may be in the form of host forensic data such as file integrity information, process information, data transfer information, and the like. As an additional example, the data 18 generated by networks 26 may be in the form of dataflows (i.e., recalculated values for dependent variables that depend on one or more changing independent variables), packet dumps, content inspection, and the like.

The system 10 of the present disclosure provides for the rapid/automated extraction of viable information from the data 18. One component or aspect of the system 10 that facilitates this purpose is one or more log or structured data managers 30 (e.g., processing platforms) communicatively coupled (via any appropriate wired or wireless network(s)) to the various root data sources 14 to receive the data 18 generated therefrom (e.g., collection). In this regard, each structured data manager 30 may use various protocols (e.g., syslog protocols, Netflow protocols) to communicate with the root data sources 14. In one arrangement, the system 10 may employ agents or system monitors 34 (e.g., software) that can operate on the individual root data sources 14 to extract data entries from registers or records of the root data sources 14. In some instances, the system monitors 34 are software protocols that are innate to the operating system of a root data source 14.

Each structured data manager 30 may broadly be configured to process received data 18 against any appropriate rule base (e.g., plurality of log processing rules) to identify a subset of data 18 (e.g., "events") that may be considered interesting to organizational analysts for various reasons. In one arrangement, each structured data manager 30 may be configured with a server process referred to as a message processing engine ("MPE") that is responsible for processing each piece or segment of data 18 against the rule base. Upon data 18 triggering a particular rule of the rule base, the MPE may automatically parse or obtain information from the data and populate one or more corresponding data or reporting fields according to instructions in the particular rule. The original (e.g., raw) data and populated data fields may together be considered an event that may be stored and made available to analysts, other system processes, and the like in any appropriate manner.

FIG. 2 presents a table of data fields that may be populated upon data 18 matching or otherwise triggering a processing rule. For instance, a tagging notation may be embedded in the processing rule that is used by the MPE to parse content from the data 18 for population into such data fields. As shown, various information may be parsed or obtained from the data and populated into corresponding data fields such as source/origin IP address, destination/impacted IP address, source/origin port number, destination/impacted port number, protocol identifier (ID), as source/origin host name, destination/impacted host name, and the like. In addition to parsing information from the structured data, the MPE or the like may also be configured to determine and populate various types of metadata into corresponding reporting fields such as processing rule ID, classification (e.g., "Audit: Access Failure," "Operations: Error," etc.), direction (e.g., internal, external), and the like. See table in FIG. 3. The structured data manager 30 (e.g., MPE) may write or store the original data text, parsed information, and/or determined metadata (e.g., collectively, an event) in one or more volatile and/or non-volatile storage mediums accessible by the structured data manager 30 and/or other system components, platforms and/or processes.

Figure 4:
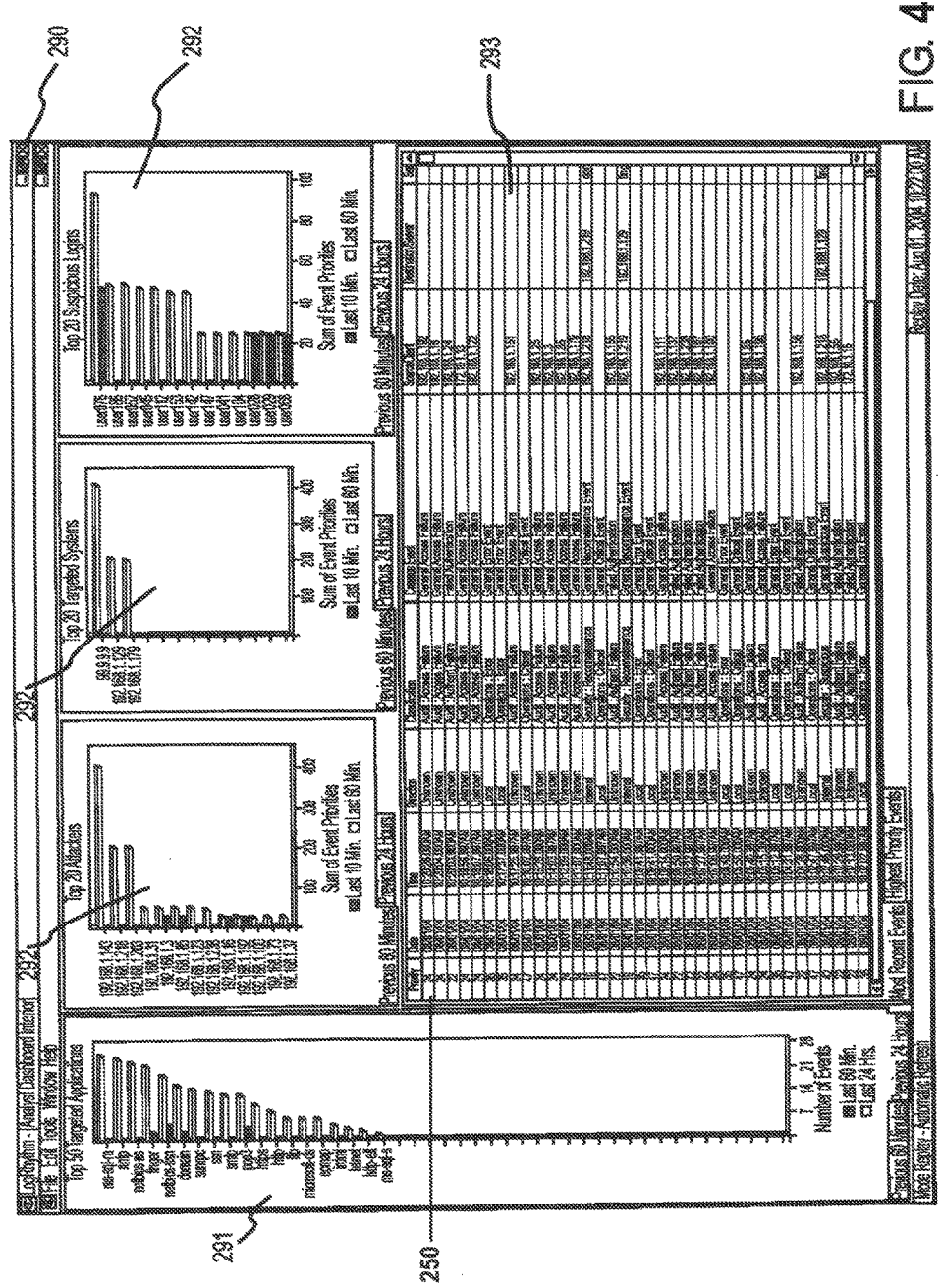
FIG. 4 illustrates a screenshot of a user interface that may provide information regarding data that has been collected and processed according to the utilities disclosed herein.
Figure 5:
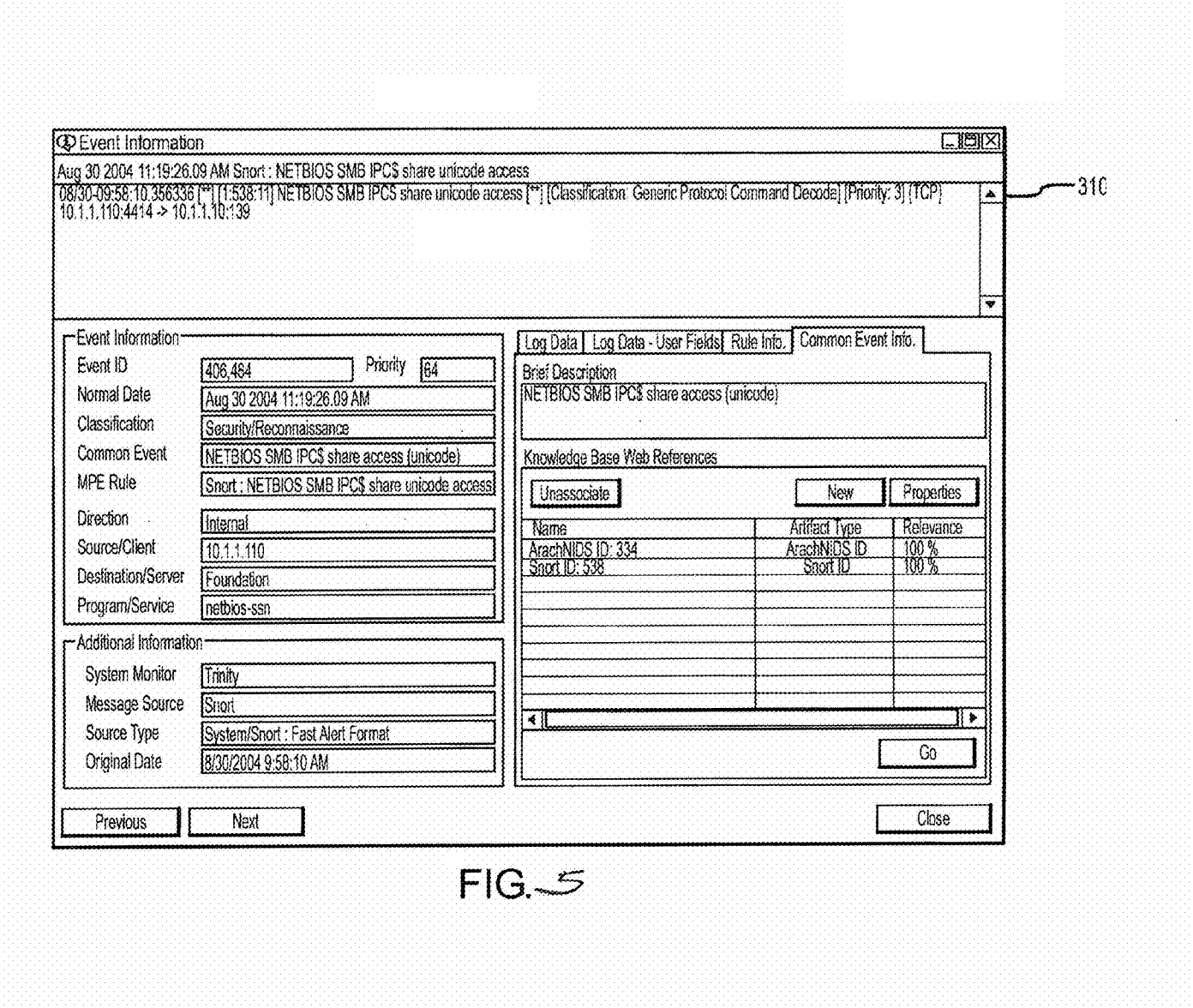

FIG. 4 presents a screenshot of a user interface that provides information regarding data that has been collected and processed according to one or more structured data managers 30 or the like (e.g., where each row may represent one or more "events") while FIG. 5 presents a screenshot resulting from a particular one of the rows of the screenshot of FIG. 4 being drilled down into by a user to present more detailed information regarding the event(s)(e.g., some or all of the parsed data and determined metadata discussed above).

Processing rules may also specify one or more additional actions the structured data manager 30 is to take upon data 18 matching or triggering a processing rule such as archiving the data or event in any appropriate archival data store, reporting, forwarding the structured data or event to (e.g., or otherwise triggering or alerting) an event or platform manager 38 to determine whether one or more alarms should be generated (e.g., by processing the events against any appropriate alarm rule(s), and/or the like. The various structured data managers 30 and event/platform managers 38 may transmit structured data, events, alerts and/or other data or messages to one or more third-party products 42 by way of any appropriate third-party services 46. Representative examples of structured data managers 30, system monitors 34, event/platform managers 38, and the like that may be used in conjunction with the system 10 may be found in U.S. Pat. No. 7,653,633 and U.S. Patent Application No. 61/360,815, the entire disclosure of each being hereby incorporated herein by reference.

In one arrangement, the system 10 may include one or more machine analytics platforms 50 broadly operable to analyze and process numerous types of data (e.g., data 18 received directly from the data sources 14; events or structured data generated by one or more log managers 30; data related to identity, asset, configuration and vulnerability management; etc.) using one or more processing rules to detect what may be complex events/conditions/developments/etc. occurring in relation to the data sources 14 while not being limited to use of traditional notions of "correlation." For instance, one machine analytics platform 50 may be configured to conduct one or more types of quantitative, correlative, behavioral and corroborative analyses to detect events from one or more disparate data sources, even when the data generated by the data sources may otherwise be considered unimportant or non-relevant when considered in a vacuum. In one arrangement, the machine analytics platforms 50 may be configured to parse data/determine metadata and populate corresponding data fields that may, together with the analyzed/processed structured data, be considered events that may be stored and/or forwarded to the event/platform manager 38 as appropriate. In one embodiment, the machine analytics platforms 50 may be in the form of the advanced intelligence engine disclosed in U.S. Pat. No. 8,543,694 which is assigned to the assignee of the present application and which is incorporated herein by reference.

One or more components, processes and/or devices of the system of FIG. 1 may be configured to generate or otherwise determine RBP scores for data (e.g., data 18, events, etc.) to allow analysts and troubleshooters to more efficiently and effectively prioritize how they address the data and take remedial action. For instance, the structured data managers 30 and machine analytics platforms 50 may be configured to generate RBP scores for data as part of processing thereof (e.g., by way of populating corresponding data fields and appending the same to the structured data). As an example, column 250 in the screenshot of FIG. 4 illustrates RBP scores assigned to a plurality of events that have been generated by a structured data manager 30 (e.g., where the RBP scores may be on a scale from 1-100, where an increasing RBP scores corresponds with an increasing level of risk to the organization).

Figure 6:
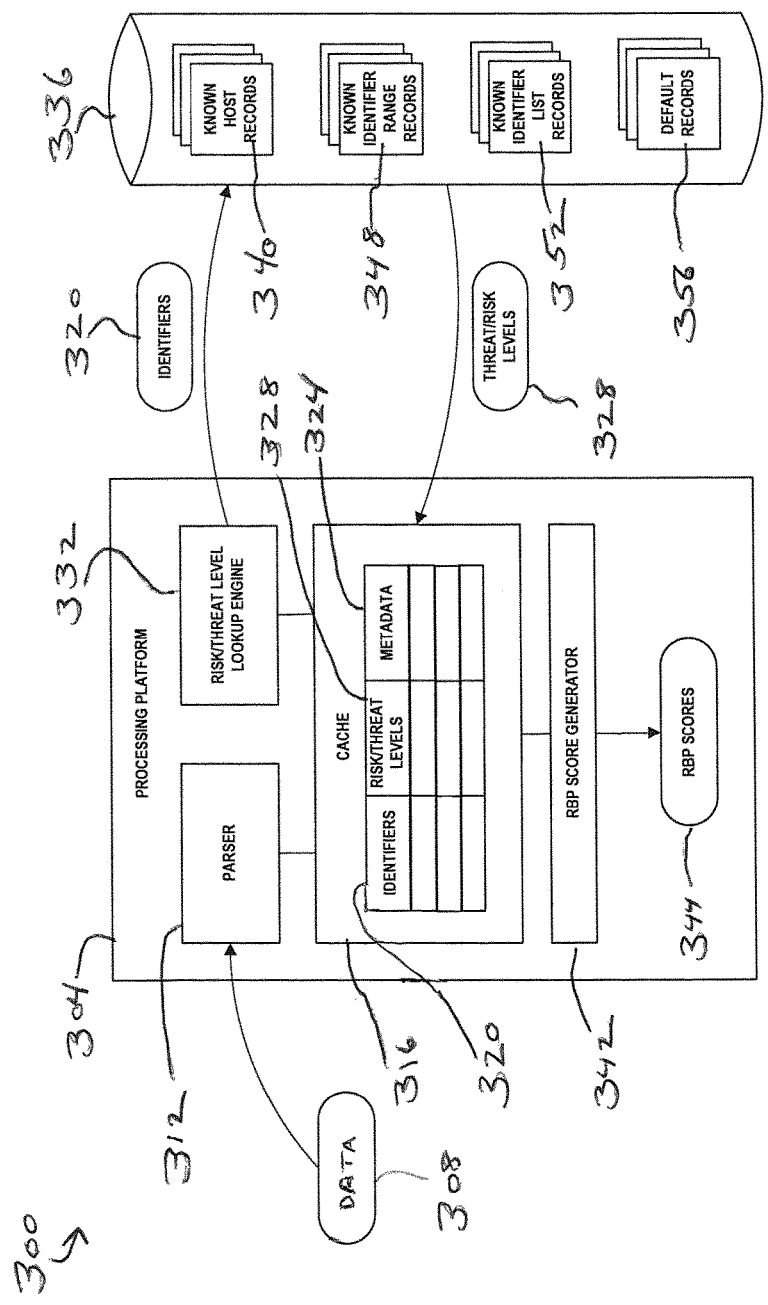
FIG. 6 is a schematic diagram of a system for use in obtaining relative risk or threat levels for identifiers parsed from data and generating RBP scores for the data.

As discussed previously, some existing products and processes for generating RBP scores for data can be inefficient and inaccurate in a number of regards resulting in alarm fatigue (e.g., too many alarms or events to consider that are not even well prioritized in the first place), RBP scores that are lower than they should be (e.g., due to failing to assign relative risk or threat levels to identifiers during RBP score generation), and the like. In this regard, FIG. 6 illustrates a schematic diagram of a system 300 for use in generating RBP scores for data in a manner that more accurately represents and prioritizes the level of risk presented by data (e.g., events) identified by structured data processing platforms to allow analysts to more effectively and efficiently spend their monitoring time. The system 300 includes a processing engine or platform 304 (e.g., including any appropriate memory, processor(s) for executing instructions from memory, etc.) that is broadly configured to obtain relative risk or threat levels for identifiers parsed from data 308 (e.g., structured data 18 in FIG. 1, events, and the like) and generate RBP scores for the structured data. The processing platform 304 may be incorporated into or otherwise in communication with the structured data manager 30, machine analytics platform 50, and/or the like. In the case of the structured data manager 30, for instance, the processing platform 300 may be configured to generate an RBP score for data (e.g., raw log(s)) upon the data matching or triggering a processing rule and populate a corresponding data field (e.g., see row 150 in FIG. 3) that may be appended to the data.

Figure 7:
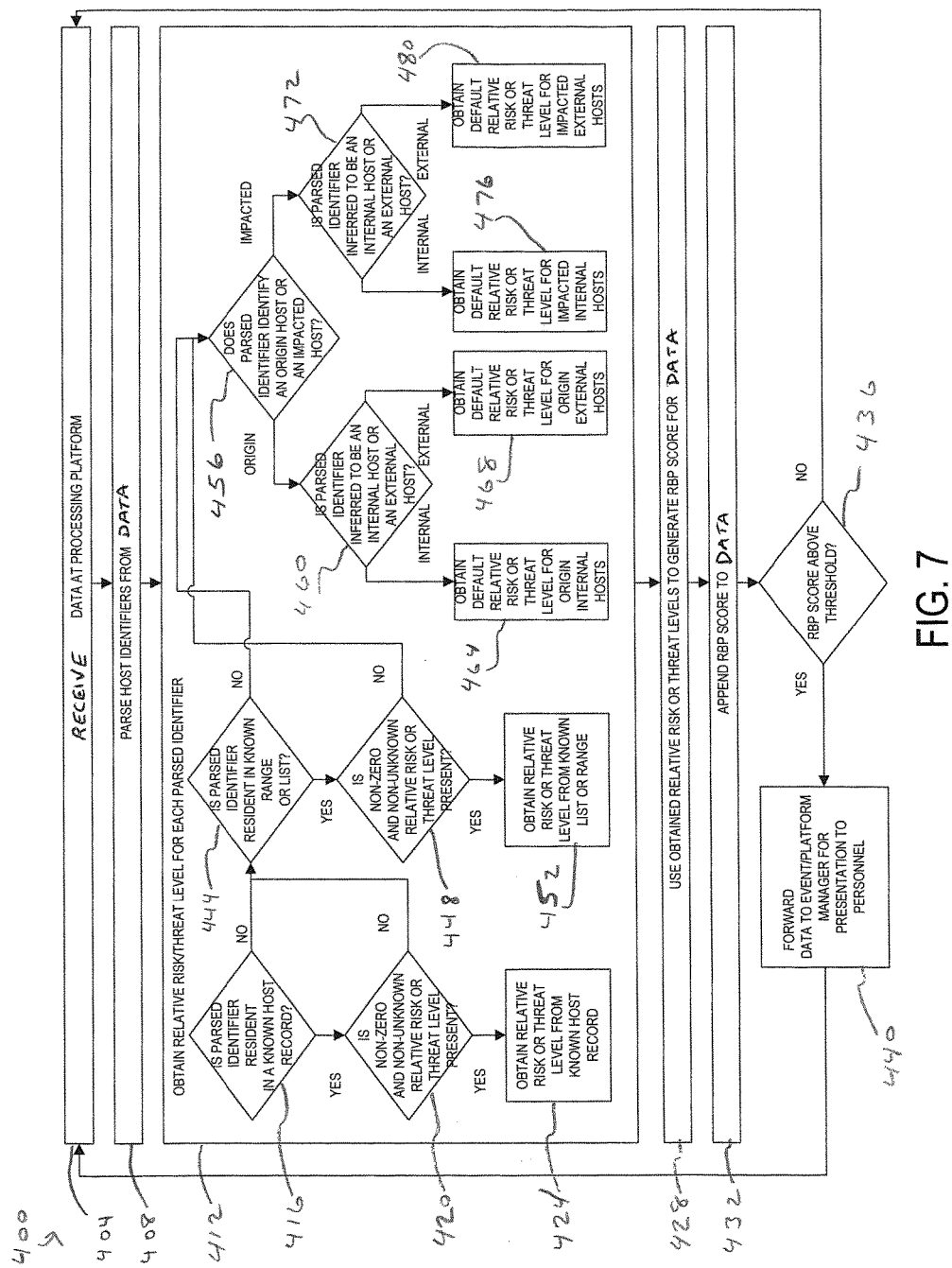
FIG. 7 is a flow diagram of a method for use in obtaining relative risk or threat levels for identifiers parsed from data and generating RBP scores for the data.

To facilitate the reader's understanding of the utilities disclosed herein, additional reference will also be made now to FIG. 7 which illustrates a flow diagram of a method 400 for use in obtaining relative risk or threat levels for identifiers parsed from data and generating RBP scores for the data. While certain steps are shown, it is to be understood that fewer, additional or different steps may sometimes be used without departing from the scope of the present disclosure. The method 400 may initially generally include receiving 404 data and parsing 408 (or otherwise obtaining) one or more host component identifiers from the received data. With reference to FIG. 6, the processing platform 304 may include a parsing engine or parser 312 (e.g., one or more sets of computer-readable instructions that are executable by one or more processors) that receives any appropriate data 308 and parses host identifiers therefrom. As one example, the parser 312 may be configured to access the data fields already populated by the structured data manager 30 and/or the machine analytics platform 50 (e.g., after a piece of raw data 18 matches or triggers a processing rule) and parse the specific content from any or all of the identifier data fields.

With reference to FIGS. 2-3, for instance, the parser 312 may be configured to parse the content from one or more of the SIP (source/origin component IP address) data field, DIP (destination/impacted component IP address) data field, SPort (source/origin component TCP/UDP port number) data field, DPort (destination/impacted component TCP/UDP port number) data field, SName (source/origin component host name) data field, DName (destination/impacted component host name) data field, and the like from the received data 308. While not shown in FIGS. 2-3, the parser 312 can also parse, obtain or otherwise determine other identifiers from the received data such as MAC addresses, fully qualified domain names (FQDNs), and/or the like. Any identifiers 320 obtained by the parser 312 may be stored in a cache 316 or the like accessible by other components of the processing platform 304. The parser 312 may store the identifiers 320 in the cache 316 along with any appropriate metadata 324 such as whether each identifier 320 identifiers a source/origin component or a destination/impacted component (e.g., which the parser 312 would surmise based on the particular data field of the structured data from which the identifier was obtained) and/or the like.

With reference to FIGS. 6-7, the method 400 may then proceed to obtain 412 a relative risk or threat level 328 for each of the identifiers 320 parsed from the data 308 and store the relative risk or threat level 328 with the particular identifier 320 in the cache 316 of the processing platform 304 (e.g., such as using risk/threat lookup engine 332 of processing platform, where the engine 332 may be in the form of one or more sets of computer-readable instructions that are executable by one or more processors). One step of the obtaining 412 may include querying 416 whether the particular identifier is resident in a "known host" record 340 of at least one database 336 that is maintained by the organization and accessible to the processing platform 304. As used herein, a known host record 328 is a data structure or list of various identifying information (e.g., IP address, host name, MAC address, and/or the like) for specific host components (e.g., routers, switches, servers, etc.) known or considered to be known to the organization. FIG. 8a presents a simplified example of a list of known host records that may be accessible to the risk/threat lookup engine 332. As shown, one of the data fields that may be populated for one or more of the records is a "Risk/Threat Level" data field.

For instance, analysts and the like may be able to assign (e.g., through any appropriate user interface) a risk or threat level to one or more known host components (as identified by particular identifiers such as IPv4 address, IPv6 address, etc.). In one arrangement, the known host components may be assigned a value in the risk/threat level data field in the range of 0-9, where 9 would represent the highest risk or threat, 1 would represent the lowest risk or threat, and 0 would represent an unknown risk or threat. In one arrangement, multiple risk or threat levels may be assigned to a particular known host component depending on whether the host component is an origin host component or an impacted host component in a particular piece or segment of data. As just one example, analysts may choose to assign an impacted risk level of 5 but an origin threat level of 2 to a particular host component (e.g., which reflects that the particular internal host component is more likely to be impacted by an occurrence on the one or more data systems than initiating an occurrence).

As an example, the risk/threat level lookup engine 332 may utilize a particular one of the identifiers obtained by the parser 312 as a key to determine whether a known host record having the particular identifier can be identified. In the event that the engine 332 identifies a known host record with the particular identifier, the engine 332 may query 420 whether the known host record includes a risk or threat level entry that represents that the organization has attributed at least some level of risk or threat to the particular identifier (and thus to the particular component associated with the particular identifier). As one example and as mentioned above, a scale of 1-9 may be used whereby where 9 would represent the highest risk or threat, 1 would represent the lowest risk or threat, and 0 would represent an unknown risk or threat. Thus, the answer to the query 420 would be yes when the known host record includes a risk or threat level entry that falls between (or includes) 1 to 9 and would be no when the known host record includes a risk or threat level entry of 0 (or when the known host record does not include a risk or threat level entry). Of course, various other scales may be used without departing from the scope of the present disclosure.

In one arrangement, an organization may maintain different sets or levels of known host records 340, where the different sets of known host records 340 may be searched in any appropriate order or manner to facilitate (e.g., expedite) searching thereof and identification of risk/threat levels 328 of parsed identifiers. For instance, a set of known host records 340 may be maintained for the entity in which the data source (e.g., the component that generated the data 308, which may not necessarily be the source/origin component responsible for initiating an occurrence on the one or more data systems described by the data 308) is present (e.g., "source entity known host records"), another set of known host records 340 may be maintained for the root entity of the entity in which the structured data source is present (e.g., "source root entity known host records"), other sets of known host records 340 may be maintained for other child entities of the root entity of the entity in which the structured data source is present (e.g., "source root entity child entity known host records"), other sets of known host records 340 may be maintained for other root entities (e.g., "other root entity known host records"), and/or a set of known host records 340 may be maintained for a global entity (e.g., "global entity known host records"). As an example, the lookup engine 332 may search such sets of known host records in any appropriate order such as the source entity known host records, then the source root entity known host records, then the source root entity child entity known host records, then the other root entity known host records, and then the global entity known host records. In the case where a known host record and a corresponding risk or threat level (e.g. non-zero and non-unknown) is identified in a particular one of the sets, then the lookup engine 332 may discontinue searching of further known host records for the particular parsed identifier 320.

In the case where multiple types of identifiers 320 are parsed from received data 308, the lookup engine 332 may in some embodiments search the known host records 320 using a particular order of the identifiers 320. As just one example in the case where identifiers 320 such as an FQDN, IP address, MAC address, and Network Basic Input/Output System ("NetBIOS") name are parsed from the structured data, the known host records 320 may be searched first using the FQDN, and then with the IP address if searching with the FQDM is unsuccessful, and then with the MAC address if searching with the IP address is unsuccessful, and then with the NetBIOS name if searching with the MAC address is unsuccessful.

With continued reference to FIGS. 6-7, and in response to a positive answer to the query 420, the engine 332 may then obtain (e.g., parse) 424 the risk or threat level 328 from the known host record 340 and store the same in the cache 316. Once risk or threat levels 328 have been obtained for identifiers 320 in the data 308, the method 400 may proceed to use the obtained risk or threat levels to generate an RBP score 344 for the data (e.g., such as using RBP score generator 342 of processing platform, where the generator 342 may be in the form of one or more sets of computer-readable instructions that are executable by one or more processors) and store the RBP score 344 in any appropriate location.

In one arrangement, the generated RBP score 344 may be inserted into the "priority" (or similar) data field 150 of FIG. 3 which may be appropriately appended or otherwise linked with the data 308 in any appropriate manner for further processing thereof. For instance, part of such further processing may include the structured data manager 30, machine analytics platform 50, and/or the like executing any appropriate processing rule to query 436 whether the RBP score 344 is above a threshold value and then forwarding 440 the data 308 and RBP score 344 to the event/platform manager 38 (or at least alerting/messaging the event/platform manager 38 of the same) for further processing thereof. As an example, the event/platform manager 38 may present a list of the data (e.g., events) having RBP scores above the threshold on any appropriate user interface (e.g., see FIG. 4 in the case where the "Highest Priority Events" tab on the bottom of the interface has been manipulated). Further details regarding generation of RBP scores and use thereof as part of further processing of data will be discussed later in this discussion.

In some cases, the answers to one of the queries 416, 420 may be negative. In the case of the query 416, for instance, there might not be a known host record 340 that includes the particular parsed identifier 320. In the case of the query 420, there might be a known host record 340 that includes the particular parsed identifier but the risk or threat level entry is zero or unknown. In some situations, analysts may intentionally configure the risk or threat level for a particular identifier in a known host record 340 to be "unknown" (e.g., by intentionally leaving the entry blank or entering a zero value).

In any case, the method 400 may, in response to negative answers to either of the queries 416, 420, proceed to determine one or more "substitute" risk or threat levels for the particular parsed identifier 320 to be used in the generation 428 of the RBP score 344 for the data 308. The substitute risk or threat level may be a value that more closely approximates what the risk or threat level would be had an analyst for the organization already chosen a specific risk or threat level for the identifier 320 and, for instance, stored the same a known host record 340 for the identifier 320 (e.g., more closely than many existing RBP score generation products that simply assume a value of zero or other fixed value for all identifiers for which risk or threat levels are unknown).

One query the lookup engine 332 may make in the above regard is whether 444 the parsed identifier 320 is resident in a known range 348 or list 352 of identifiers. For instance, in addition or as an alternative to maintaining different known host records for different respective identifiers, organizations may maintain one or more ranges 348 of identifiers (e.g., range of IP address) and/or one or more lists 352 of identifiers, where each respective range 348 or list 352 may be assigned or otherwise associated with a respective relative risk or threat level. FIGS. 8b and 8c illustrate simplified respective known identifier range and list records and corresponding respective relative risk or threat levels that may be maintained by an organization. In response to a positive answer to the queries 444, 448, the lookup engine 332 may obtain 452 the corresponding relative risk or threat level 328 and store the same in the cache 316 along with the corresponding identifier 320. In this regard, the risk or threat level assigned to the range 348 or list 352 may serve as the substitute risk or threat level 328 for all parsed identifiers 320 found or resident with the range 348 or list 352.

In one arrangement, an organization may maintain different sets or levels of known identifiers range records 348 and/or different sets or levels of known identifiers list records 348, where the different sets may be searched in any appropriate order or manner to facilitate (e.g., expedite) searching thereof and identification of risk/threat levels 328 of parsed identifiers. As just one example, different sets of known identifier range records may be maintained for the entity in which the data source is present, the root entity of the entity in which the data source is present, etc. as discussed previous in relation to the known host records 340.

The processing platform 304 (e.g., lookup engine 332 or the like) may employ various different conflict resolution techniques in the case where a particular identifier 320 is resident within both a known identifier range 348 and a known identifier list 352. In one arrangement, analysts may be able to specify (e.g., via configuring any appropriate policy) that the known identifier ranges 348 are to generally take precedence over the known identifier lists 352 such that the lookup engine 332 obtains and stores the risk or threat level 328 of the particular known identifier range 348 within which the parsed identifier 320 is resident in the cache 316 rather than that of the particular known identifier list 352 within which the parsed identifier 320 is resident (or vice versa). In another arrangement, the lookup engine 332 may be configured to obtain the highest risk or threat level of the particular known identifier range 348 and particular known identifier list 352 within which the parsed identifier 320 is resident and store the same in the cache 316. In a further arrangement, the lookup engine 332 may be configured to obtain an average of the risk or threat level of the particular known identifier range 348 and particular known identifier list 352 within which the parsed identifier 320 is resident and store the same in the cache 316.

In the case where the identifier is resident within two or more known identifier ranges 348, the lookup engine 332 may be configured to obtain the highest or average of the risk or threat levels of the two or more known identifier ranges 348 and then store the same as the risk or threat level 328 of the identifier 320 in the cache 316 (or use the same as the risk or threat level for the known identifier ranges 348 to compare against or average with that/those of the known identifier lists 352 as discussed above). Similarly, in the case where the identifier 320 is resident within two or more known identifier lists 352, the lookup engine 332 may be configured to obtain the highest or average of the risk or threat levels of the two or more known identifier lists 352 and then store the same as the risk or threat level 328 of the identifier 320 in the cache 316 (or use the same as the risk or threat level for the known identifier lists 352 to compare against or average with that/those of the known identifier ranges 348 as discussed above). It is to be understood that various other conflict resolutions techniques may be used and are encompassed within the scope of the present disclosure.

Figure 9:
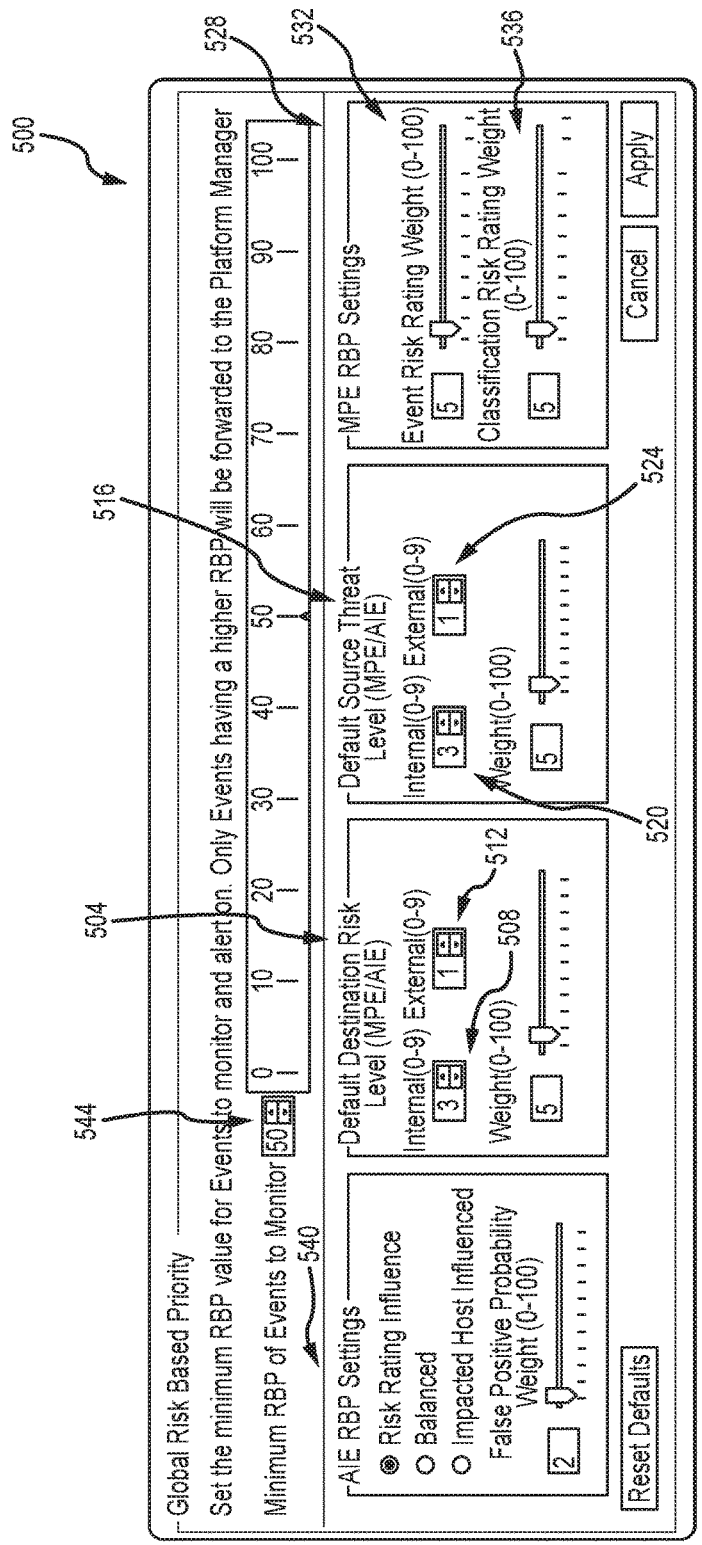
FIG. 9 is a screenshot of a user interface for use in configuring default relative risk or threat levels for use with the system of FIG. 6 and the method of FIG. 7.

Another type of substitute risk or threat level that may be obtained by the processing platform 304 (e.g., by the lookup engine 332) in response to the answers to one of the queries 416, 420 being negative is a "default" risk or threat level that may be used for identifiers (e.g., and/or the host components identified by the identifiers) having certain qualifications or that are associated with particular metadata (e.g., such as particular content in one or more of the data fields of FIGS. 2-3). For instance, FIG. 9 illustrates an exemplary screenshot 500 of a user interface that may be used by analysts to configure specific default risk or threat levels for identifiers, where the default risk or threat levels 356 may be stored in the at least one database 336 and may be accessible by the lookup engine 332. As an example, the screenshot 500 may include a default destination/impacted component risk level portion 504 including first and second user manipulatable features 508, 512 (e.g., cells, buttons, drop-down lists, etc.) that allow analysts to set or specify default risk levels for default destination/impacted components that are inferred to be "internal" and "external" host components, respectively (e.g. on a scale from 1-9 as in previous examples herein). Similarly, the screenshot 500 may include a default source/origin component threat level portion 516 including first and second user manipulatable features 520, 524 (e.g., cells, buttons, drop-down lists, etc.) that allow analysts to set or specify default risk levels for source/origin components that are inferred to be "internal" and "external" host components, respectively (e.g. on a scale from 1-9 as in previous examples herein).

In one arrangement, the processing platform 304 (e.g., lookup engine 332) may proceed to obtain default 356 risk or threat levels for parsed identifiers 320 in response to negative answers to the queries 412, 420. In another arrangement, the processing platform 304 (e.g., lookup engine 332) may proceed to obtain default 356 risk or threat levels for parsed identifiers 320 in response to negative answers to the queries 444, 448. In any case, one query 456 that may be made by the lookup engine 332 in relation to obtaining a default risk or threat level 356 for a parsed identifier 320 is whether the parsed identifier identifies a source/origin host component or an impacted/destination host component. As an example, the lookup engine 332 may access the metadata 324 in the cache 316 to determine whether the parsed identifier 320 represents a source/origin host component or an impacted/destination host component. For instance, the parser 312 may be configured to obtain and store various types of metadata 324 in the cache 316, one piece of which may be the label or heading of the particular data field from which the identifier was previously parsed. With reference to FIG. 2, for instance, "SIP," "DIP," SName," etc. and/or equivalent labels (e.g., "Source," "Origin," "Impacted," "Destination," etc.) may be stored as metadata 324 in the cache 316 and accessed by the lookup engine 332 as part of the query 456.

In the case where the parsed identifier 320 is determined as part of query 456 to represent a source/origin host component, the lookup engine 332 may then infer 460 whether the parsed identifier 320 represents an internal host component or an external host component. Similarly, in the case where the parsed identifier 320 is determined as part of query 456 to represent a destination/impacted host component, the lookup engine 332 may then infer 472 whether the parsed identifier 320 represents an internal host component or an external host component. The lookup engine 332 may then proceed to obtain 464, 468, 476, 480 the default risk or threat level for source/origin internal hosts, source/origin external hosts, impacted/destination internal hosts, or impacted/destination external hosts from the list of default risk/threat levels 356 and store the same in the cache 316 based on a result of the queries 460, 472.

The lookup engine 332 may performing the inferring steps 460, 472 in any appropriate manner. In one arrangement, the lookup engine 332 may infer that the parsed identifier 320 infers an internal host component when the parsed identifier 320 identifies a known host that is configured as an internal host component and infer that the parsed identifier 320 infers an external host component when the parsed identifier 320 identifies a known host that is configured as an external host component (e.g., in the known host records 340 of FIG. 6). With reference to the simplified exemplary known host records of FIG. 8a, for instance, the lookup engine 332 may use the parsed identifier 320 as a key to determine whether a known host record exists that is specifically configured as an "internal" host or an "external" host (e.g., via an "internal" or "external" entry in the "Type" data field or column). Identified known host records in this step may be those whose risk/threat levels are unknown (e.g., have an entry of zero or otherwise outside of the available risk/threat level range, or do not have an entry).

In another arrangement, the lookup engine 332 may infer that the parsed identifier 320 infers an internal host component when the parsed identifier 320 is resident within at least one network range that is configured as an internal network and infer that the parsed identifier 320 infers an external host component when the parsed identifier 320 is resident within at least one network range that is configured as an external network (e.g., in the known identifier range records 348 of FIG. 6). With reference to the simplified exemplary known identifier range records of FIG. 8b, for instance, the lookup engine 332 may determine whether the parsed identifier 320 is resident within any of the specified identifier ranges that is specifically configured as an "internal" network or an "external" network (e.g., via an "internal" or "external" entry in the "Type" data field or column). Identified known identifier range records in this step may be those whose risk/threat levels are unknown (e.g., have an entry of zero or otherwise outside of the available risk/threat level range, or do not have an entry). In a further arrangement, the lookup engine 332 may infer that the parsed identifier 320 infers an internal host component when the parsed identifier 320 is resident within at least one private network range (e.g., 10.0.0.0-10.255.255.255, 172.16.0.0-172.31.255.255, or 192.168.0.0-192.168.255.255) and infer that the parsed identifier 320 infers an external host component when the parsed identifier 320 is not resident within at least one private network range.

In one variation, an organization may maintain different sets of default risk or threat levels that may be access and used by the lookup engine 332 in any appropriate manner. For instance, one set 356 of default risk or threat levels may be maintained for the root entity of the data source and another set of default risk or threat levels may be maintained for the global entity. In the event that default settings were not set or configured at the data source level, then the default settings at the global level may be sampled.

The risk or threat levels 328 for each respective identifier 320 parsed from the data 308 may be obtained in any appropriate order. In one arrangement, the lookup engine 332 may initially cycle through the known host records 340 for all of the parsed identifiers successively and store the obtained risk or threat levels in the cache 316. For any parsed identifiers for which zero or unknown risk or threat levels are obtained, the lookup engine may then obtain substitute risk or threat levels for the same as discussed herein. In another arrangement, the lookup engine may, upon determining that a non-zero and non-unknown risk or threat level for a particular identifier cannot be found in the known host records 340, proceed to obtain a substitute risk or threat level for the parsed identifier 320 even before assessing whether non-zero and non-unknown risk or threat levels can be obtained from the known host records 340 for the other parsed identifiers.

Upon obtaining the risk or threat levels 328 for the parsed origin and impacted host identifiers 320, the method 400 may proceed to use 428 the obtained risk or threat levels 328 to generate an RBP score 344 for the data 308 (e.g., such as using RBP score generator 342 of processing platform 304) and store the RBP score 344 in any appropriate location. In one arrangement, the RBP score 344 may be appended 432 to the data 308 in any appropriate manner for further processing of the data (e.g., such as by inserting the generated RBP score 344 into the "priority" (or similar) data field 150 of FIG. 3 which may be appropriately appended or otherwise linked with the data 308 in any appropriate manner for further processing thereof).

The processing platform 304 (e.g., RBP score generator 342) may be configured to combine and/or manipulate the various relative risk or threat levels 328 in any appropriate manner (e.g., adding, averaging, and/or the like) to generate the RBP score 342 for the data 308 and exemplary manners of doing so will be discussed below. Before doing so, however, it is noted that additional types of relative risk or threat levels may be appropriately combined with those of the parsed identifiers to determine the RBP score 344 for the data 308. As discussed previously, the structured data managers 30 and machine analytics platforms 50 may be configured to process received data 308 (e.g., data 18 in FIG. 1) against one or more data processing rules to identify a subset of the data 18 (e.g., "events") that may be considered interesting to organizational analysts for various reasons. In one arrangement, analysts may be able to configure or set a specific risk or threat value to one or more particular processing rules (e.g., such as during initial configuration of the processing rule via any appropriate user interface). Upon a particular segment of data being identified by the processing rule as being of interest (e.g., as being an "event"), the structured data managers 30 and/or machine analytics platforms 50 may append the risk or threat level associated with the processing rule (e.g., and thus with the particular event) to the data (e.g., such as by inserting the particular risk or threat level into a corresponding data field that is appended to the data for further processing). For instance, the processing platform 304 may, as part of obtaining risk or threat levels for identifiers parsed from the data, also obtain the risk or threat level of particular processing rule that processed the data 308 and store the same in the cache 316 for use by the RBP score generator 342.

Another type of relative risk or threat level that may be appropriately combined with those of the parsed identifiers to determine the RBP score 344 for the data 308 are risk or threat levels associated with a particular classification of the data 308. In one arrangement, analysts and the like may be able to assign risk or threat levels to various classifications that the structured data managers 30 and/or machine analytics platforms 50 may assign to the data 308 as part of processing thereof (e.g., "Operations: Error," "Security: Suspicious," etc.). For instance, analysts may be able to configure such risk or threat levels to various classifications via any appropriate user interface in communication with the structured data managers 30 and/or machine analytics platforms 50 which may be stored in any appropriate database(s). Upon processing of data and determination that the data is to be assigned a particular classification, the structured data managers 30 and/or machine analytics platforms 50 may access the risk or threat level of the particular classification from the one or more database and appropriately append the same to the data. Alternatively, the processing platform 304 may identify the classification of the data and then access the risk or threat level(s) of the same from the one or more databases.

In some embodiments, one or more of the relative risk or threat levels may be weighted in any appropriate manner before or as part of determination of the RBP score 344 for the data 308 to provide personnel with more fine grained control over how RBP scores are determined. As just one example, a particular classification being assigned to data may be highly indicative that an event has occurred that is of low interest to organizational personnel and thus may be assigned a high relative risk level of 80 on a scale of 1-100 by personnel but a low weighting level of 20 on a scale of 1-100. On the other hand, another particular classification being assigned to data may not be very indicative that a highly interesting event has occurred and thus may be assigned a low relative risk level of 15 on a scale of 1-100 by personnel but a high weighting level of 85 on a scale of 1-100. With reference again to FIG. 9, for instance, the screenshot 500 may include a portion 528 having first and second user manipulatable features 532, 536 (e.g., cells, buttons, drop-down lists, etc.) that allow analysts to set or specify default event and classification risk rating weights.

Several exemplary manners of combining and manipulating the various obtained risk or threat levels to generate 428 RBP scores 342 will now be discussed although it is to be understood that various other manners of doing so are envisioned and encompassed within the scope of the present disclosure.

EXAMPLE 1

$$RBP\ score = \left(\frac{CRR_p + ERR_p + DRT_p + STL_p}{MaxPossibleRiskPoints}\right) \times 100$$

where
$CRR_p$=Classification Risk Points=Classification Risk Level*Classification Risk Level Weight;
$ERR_p$=Event Risk Rating Points=Event Risk Level*Event Risk Level Weight;
$DRT_p$=Destination Risk Rating Points=Destination Risk Level*Destination Risk Level Weight; and
$STL_p$=Source Threat Rating Points=Source Threat Level*Source Threat Level Weight.

As discussed previously, any appropriate ranges or scales of risk or threat levels may be utilized. In one arrangement, each of the destination risk level, destination risk weight, source threat level, and source threat weight may be in the range of 1-9 while each of the classification risk level, classification risk weight, event risk level, and event risk weight may be in the range of 1-100.

EXAMPLE 2

$$RBP\ score = \left(\frac{CRR_p + ERR_p + FAR_p + DRT_p + STL_p}{MaxPossibleRiskPoints}\right) \times 100$$

where,
$FAR_p$=False Alarm Risk Rating Points=False Alarm Risk Level*False Alarm Weight.

In the below examples, analysts may be able to manually choose whether the event risk level is to have more of an effect or influence on the RBP score than the destination risk level, whether the destination risk level is to have more of an effect or influence on the RBP score than the event risk level, or whether the event risk level and destination risk level are to have a substantially balanced effect or influence on the RBP score.

EXAMPLE 3

(Event Risk Level Influenced and Source Threat Level and Destination Risk Levels Known)

$$RBP\ score = \left(\left(\frac{RR_i}{50}-2\right)\left(\frac{RR_i}{100}-0.5\right)\left(-\sqrt{1-\frac{1}{8^2}(RR-1)^2}+1\right)+\right.$$
$$\left(\frac{RR}{50}\left(\frac{RR}{100}-0.5\right)\left(\sqrt{1-\frac{1}{8^2}(RR-9)^2}\right)-\right.$$
$$\left(\frac{RR_i}{25}\left(\frac{RR_i}{100}-1\right)\left(\frac{\tan(0.2923*RR-1.461)}{1.5\pi}+0.5\right)\left(\frac{73}{100}\right)\right)+$$
$$\left(\frac{(9-FPP)(FPP_w)+(STL*STL_w)+(DRL*DRL_w)}{9(FPP_w+STL_w+DRL_w)}\right)\left(\frac{27}{100}\right)$$

where,
STL=Source Threat Level;
STL$_w$=Source Threat Level Weight;
DRL=Destination Risk Level;
DRL$_w$=Destination Risk Level Weight;
DRL$_i$=Destination Risk Level Influence;
RR=Event Risk Level;
RR$_w$=Event Risk Level Weight;
FPP=False Positive Probability (e.g., likelihood of an RBP score higher than it should be);
FPP$_w$=False Positive Probability Weight;

EXAMPLE 4

(Event Risk Level Influenced and Source Threat Level and Destination Risk Levels Unknown)

$$RBP\ score = \left(\left(\frac{RR_i}{50}-2\right)\left(\frac{RR_i}{100}-0.5\right)\left(-\sqrt{1-\frac{1}{8^2}(RR-1)^2}+1\right)+\right.$$
$$\left(\frac{RR_i}{50}\left(\frac{RR_i}{100}-0.5\right)\left(\sqrt{1-\frac{1}{8^2}(RR-9)^2}\right)-\right.$$
$$\left(\frac{RR_i}{25}\left(\frac{RR_i}{100}-1\right)\left(\frac{\tan(0.2923*RR-1.461)}{1.5\pi}+0.5\right)\left(\frac{73}{100}\right)\right)+$$
$$\left(\frac{(9-FPP)(FPP_w)}{9}\right)\left(\frac{27}{100}\right)$$

EXAMPLE 5

(Destination Risk Level Influenced and Source Threat Level and Destination Risk Levels Known)

$$RBP\ score = \left(\left(\frac{DRL_i}{50}-2\right)\left(\frac{DRL_i}{100}-0.5\right)\left(-\sqrt{1-\frac{1}{9^2}(DRL)^2}+1\right)+\right.$$

-continued
$$\left(\frac{DRL_i}{50}\left(\frac{DRL_i}{100}-0.5\right)\left(\sqrt{1-\frac{1}{9^2}(DRL-9)^2}\right)-\right.$$
$$\left(\frac{DRL_i}{25}\left(\frac{DRL_i}{100}-1\right)\left(\frac{\tan(0.259*DRL-1.16)}{1.5\pi}+0.5\right)\left(\frac{73}{100}\right)\right)+$$
$$\left(\frac{(9-FPP)(FPP_w)+(STL*STL_w)+(DRL*DRL_w)}{9(FPP_w+STL_w+DRL_w)}\right)\left(\frac{27}{100}\right)$$

EXAMPLE 6

(Destination Risk Level Influenced and Source Threat Level and Destination Risk Levels Unknown)

$$RBP\ score = \left(\frac{(9-FPP)(FPP_w)+(RR*RR_w)}{9(FPP_w+RR_w)}\right)$$

EXAMPLE 7

(Balanced and Source Threat Level and Destination Risk Levels Known)

$$RBP\ score =$$
$$+\left(\frac{(9-FPP)(FPP_w)+(RR*RR_i)+(DRL*DRL_w)+(STL*STL_w)}{9(FPP_w+RR_w+DRL_w+STL_w)}\right)$$

EXAMPLE 8

(Balanced and Source Threat Level and Destination Risk Levels Unknown)

$$RBP\ score = \left(\frac{(9-FPP)(FPP_w)+(RR*RR_w)}{9(FPP_w+RR_w)}\right)$$

With reference to FIG. 9, for instance, the screenshot 500 may include a portion 540 including one or more user manipulatable features that allow analysts to select whether the "Event Risk Level Influenced" equations are to be used, whether the "Destination Risk Level Influenced" equations are to be used, or whether the "Balanced" equations are to be used. In one arrangement, one or both of the Equations 1 and 2 may be implemented by a processing platform 304 of the structured data manager 30 while one or more of Equations 3-8 may be implemented by a processing platform 304 of the machine analytics platform 50.

With reference back to FIGS. 6-7, the method may include querying 436 whether the generated RBP score 344 is above a particular threshold and then forwarding 440 the data to the event/platform manager (e.g., event/platform manager 38 of FIG. 1) for presentation to personnel (e.g., see FIG. 4 in the case where the "Highest Priority Events" tab on the bottom of the interface has been manipulated) and/or for further processing. As an example, execution of the threshold query 436 may be implemented by any appropriate processing rule executed by the structured data manager 30 and/or machine analytics platform 50. For instance, portion 544 of the screenshot 500 of FIG. 9 illustrates one manner in which analysts may configure the threshold to be used in the query 436 of FIG. 7.

It will be readily appreciated that many additions and/or deviations may be made from the specific embodiments disclosed in the specification without departing from the spirit and scope of the invention. For instance, while the various records 340, 348, 352, 356 are illustrated for clarity in a single database 336, it is to be understood that one or more of the records may actually exist in additional databases (e.g., additional physical and/or virtual locations) that are accessible to the processing platform 304. As another example, the RBP score generator 342 may sometimes make use of risk or threat levels of identifiers that identify a particular entity (e.g., entity in which the data source is a resident), region, zone, and/or the like. As a further example, it has been discussed how a risk or threat level of zero may cause the lookup engine 332 to proceed to a subsequent step of the method 400 of FIG. 7. For instance, in response to the lookup engine 332 determining at step 420 that a risk/threat level of zero is identified for a particular parsed identifier, the lookup engine 332 may proceed to identify a "substitute" risk/threat level for the parsed identifier at steps 444 or 456 and use the substitute risk/threat level as part of generation of the RBP score for the data at step 428. In other arrangements, however, risk/threat levels of zero may be used as part of generation of the RBP score for the data at step 428.

Embodiments disclosed herein can be implemented as one or more computer program products, i.e., one or more modules of computer program instructions encoded on a computer-readable medium for execution by, or to control the operation of, data processing apparatus. For example, the logic or software of the processing platform 304 may be provided in such computer-readable medium of the structured data manager 30 or the like (or in other devices or systems with which the host computers are in communication) and executed by a corresponding processor or processing engine. The computer-readable medium can be a machine-readable storage device, a machine-readable storage substrate, a non-volatile memory device, a composition of matter affecting a machine-readable propagated signal, or a combination of one or more of them. In this regard, the processing platform 304 may encompass one or more apparatuses, devices, and machines for processing data, including by way of example a programmable processor, a computer, or multiple processors or computers. In addition to hardware, the processing platform 304 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A method for use in monitoring data generated by one or more data systems, the method comprising:
   receiving, at a processor over at least one communications network, data generated by one or more data systems;
   operating the processor to parse from a data field of the data at least one of an origin host identifier associated with an origin host component responsible for initiating an occurrence on the one or more data systems and an impacted host identifier associated with an impacted host component that is affected by an occurrence on the one or more data systems;

determining, by the processor, that the at least one of the origin host identifier and impacted host identifier cannot be used to obtain a previously-configured relative risk or threat level for the origin host component or impacted host component from a database of known hosts and corresponding previously-configured relative risk or threat levels;

determining, by the processor, that the at least one of the origin host identifier and impacted host identifier is not resident within at least a first list of identifiers, wherein the first list of identifiers is assigned a first relative threat level;

obtaining, by the processor, a substitute relative risk or threat level for the origin host component or impacted host component using the at least one of the origin host identifier and impacted host identifier, wherein the obtaining includes using the at least one of the origin host identifier and impacted host identifier to obtain at least one default threat level for the origin host component or impacted host component, wherein the substitute relative risk or threat level is the at least one default risk or threat level, wherein the at least one default risk or threat level is one or more first default threat levels when the at least one of the origin host identifier and impacted host identifier is the origin host identifier, and wherein the at least one default risk or threat level is one or more second default risk levels when the at least one of the origin host identifier and impacted host identifier is the impacted host identifier, wherein the at least one default risk or threat level is obtained based on the determining that the at least one of the origin host identifier and impacted host identifier is not resident within the first list of identifiers;

inferring, by the processor, whether the at least one of the origin host identifier and impacted host identifier identifies an internal host or an external host, wherein the inferring includes obtaining a heading of the data field and determining that the at least one of the origin host identifier and impacted host identifier identifies an internal host or an external host based on the obtained heading, wherein the at least one default risk or threat level is obtained based on a result of the inferring, wherein the one or more first default threat levels includes an external host default threat level for when the origin host component is inferred to be an external host and an internal host default threat level for when the origin host component is inferred to be an internal host, and wherein the one or more second default risk levels includes an external host default threat level for when the impacted host component is inferred to be an external host and an internal host default threat level for when the impacted host component is inferred to be an internal host; and generating, with the processor, a risk based priority score for the data with the substitute relative risk or threat level.

2. The method of claim 1, further including:
writing the risk based priority score to a field in the data.

3. The method of claim 1, further including:
determining that the at least one of the origin host identifier and impacted host identifier cannot be used to obtain a relative risk or threat level of a known network range within which the at least one of the origin host identifier and impacted host identifier is present.

4. The method of claim 1, further including:
determining, by the processor, whether the at least one of the origin host identifier and impacted host identifier identifies a known host that is configured as an internal host or an external host, wherein the inferring includes inferring that the at least one of the origin host identifier and impacted host identifier identifies an internal host when the at least one of the origin host identifier and impacted host identifier identifies a known host that is configured as an internal host, and wherein the inferring includes inferring that the at least one of the origin host identifier and impacted host identifier identifies an external host when the at least one of the origin host identifier and impacted host identifier identifies a known host that is configured as an external host.

5. The method of claim 1, further including:
determining, by the processor, whether the at least one of the origin host identifier and impacted host identifier is resident within at least one network range that is configured as an internal network or an external network, wherein the inferring includes inferring that the at least one of the origin host identifier and impacted host identifier identifies an internal host when the at least one of the origin host identifier and impacted host identifier is resident within at least one network range that is configured as an internal network, and wherein the inferring includes inferring that the at least one of the origin host identifier and impacted host identifier identifies an external host when the at least one of the origin host identifier and impacted host identifier is resident within at least one network range that is configured as an external network.

6. The method of claim 1, further including:
determining whether the at least one of the origin host identifier and impacted host identifier is resident within at least one private network range, wherein the inferring includes inferring that the at least one of the origin host identifier and impacted host identifier identifies an internal host when the at least one of the origin host identifier and impacted host identifier is resident within at least one private network range, and wherein the inferring includes inferring that the at least one of the origin host identifier and impacted host identifier identifies an external host when the at least one of the origin host identifier and impacted host identifier is not resident within at least one private network range.

7. The method of claim 1, further including:
obtaining, by the processor, a risk rating assigned to a classification of the data determined by a processing rule used to process the data, wherein the generating includes generating the risk based priority score with classification risk rating.

8. The method of claim 7, wherein the using includes:
allowing, by the processor, one of the classification risk rating and the substitute relative risk or threat level to influence generation of the risk based priority score more than the other of the classification risk rating and the substitute relative risk or threat level.

* * * * *